United States Patent [19]

Tanaka et al.

[11] 4,306,970
[45] Dec. 22, 1981

[54] MAGNETIC PARTICLE SEPARATING DEVICE

[75] Inventors: Hiroto Tanaka, Kamifukuoka; Yasumasa Kohno, Fujisawa; Hideyuki Tanaka, Sendai, all of Japan

[73] Assignee: Ishikawajima-Harima Jukogyo Kabushiki Kaisha, Japan

[21] Appl. No.: 137,372

[22] Filed: Apr. 4, 1980

[30] Foreign Application Priority Data

Apr. 10, 1979 [JP] Japan ................................. 54-43271
Apr. 10, 1979 [JP] Japan ................................. 54-43272

[51] Int. Cl.³ ........................ B01D 35/06; B03C 1/14
[52] U.S. Cl. .............................. 210/222; 209/223 R; 209/227; 209/216
[58] Field of Search ............................. 210/222, 223; 209/223 R, 232, 216, 227, 222, 213–215; 55/100, 3; 406/86, 49, 106, 181, 197; 137/827

[56] References Cited

U.S. PATENT DOCUMENTS

| 709,982 | 9/1902 | Meberle | 209/232 |
|---|---|---|---|
| 1,425,235 | 8/1922 | Bradley | 209/223 R |
| 1,463,713 | 7/1923 | Mosdey | 209/216 X |
| 1,729,589 | 9/1929 | Mosdey | 209/227 |
| 2,533,966 | 12/1950 | Simmons | 55/100 X |
| 2,763,125 | 9/1956 | Kadosch | 137/827 X |
| 2,954,122 | 9/1960 | Colburn | 210/222 X |
| 2,973,096 | 2/1961 | Greaves | 210/222 X |
| 2,979,202 | 4/1967 | Orbeliani | 210/222 X |
| 3,021,007 | 2/1962 | Jones | 209/223 R |
| 3,289,836 | 12/1966 | Weston | 209/232 X |
| 3,567,026 | 3/1971 | Kolan | 210/222 |
| 3,887,457 | 6/1975 | Marston | 209/214 |
| 3,895,386 | 7/1971 | Kradel | 209/232 |
| 3,998,741 | 12/1976 | Councell | 210/222 |
| 4,160,788 | 9/1979 | Druz | 209/223 R X |

FOREIGN PATENT DOCUMENTS

| 203900 | 7/1957 | Austria | 209/222 |
|---|---|---|---|
| 1910574 | 9/1970 | Fed. Rep. of Germany | 55/100 |
| 20552 | of 1914 | United Kingdom | 209/232 |
| 254423 | 3/1970 | U.S.S.R. | 210/222 |
| 580907 | 12/1977 | U.S.S.R. | 209/227 |

Primary Examiner—Robert Halper
Attorney, Agent, or Firm—B. B. Olive

[57] ABSTRACT

A magnetic particle separating device in which magnetic particles entrained or contained in coolants, lubricants or working fluids are separated and removed by the application of magnetic fields.

6 Claims, 11 Drawing Figures

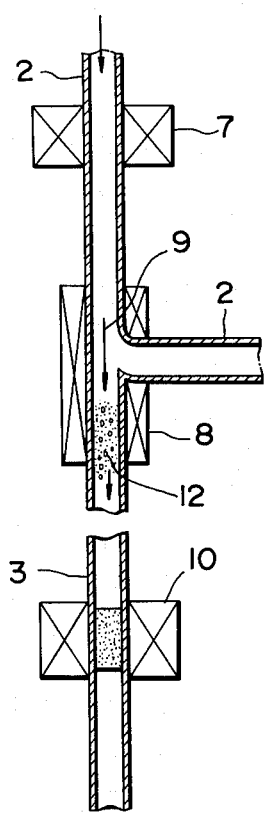
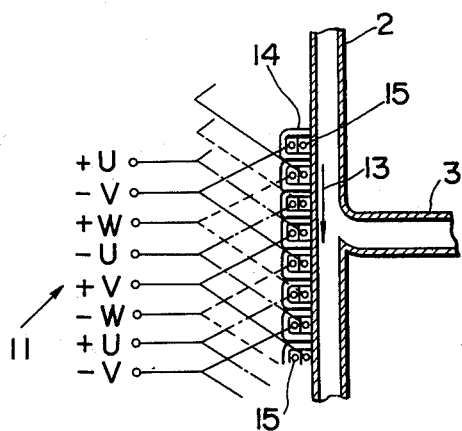

MAGNETIC PARTICLE SEPARATING DEVICE

BACKGROUND OF THE INVENTION

The present invention relates to a magnetic particle separating device.

In general, the longer the period of operation of a liquid handling system such as a hydraulic, lubrication or cooling system becomes, the higher the contents of magnetic particles, which result from the corrosion and wear of the system components and are entrained in the liquid, become. As a result, in order to limit the quantities of magnetic particles less than a predetermined tolerance level, they must be periodically separated and removed from the liquid by a suitable device.

In this specification, the magnetic particle separating device of the present invention will be described in conjunction with the separation of radioactive CRUD (Canadian Reactor Unknown Deposits) particles entrained in the primary and secondary coolants in a reactor cooling system.

During the operation of the reactor, the coolants inevitably entrain CRUD particles from a steel pressure vessel, heat exchangers, fuel rods, pipes and so on. CRUD particles consist of magnetitic ($Fe_3O_4$), maghemitic (gamma-$Fe_2O_3$) and hematitic (alpha-$Fe_2O_3$) particles. So far, because of a relatively short history of reactor operation, the separation and removal of CRUD particles from the coolants has not been made. However, it is quite apparent that the longer the period of reactor operation becomes, the higher the quantities of CRUD particles entrained in the coolants become. In addition, CRUD particles are contaminated or radioactive, having an extremely higher degree of space dose. It follows therefore that the separation and removal of CRUD particles from the coolant can obviously reduce the chance of the reactor operators being exposed to the radioactive contaminants in the case of periodical inspection and maintenance and repairs of reactor components. In addition, rediation in a reactor plant can be considerably suppressed and the reuse of water coolant becomes possible.

It is therefore a primary object of the present invention to provide a magnetic particle separating device which can positively separate and remove CRUD particles from the coolants circulated through a reactor cooling system, thereby ensuring the more safeguarded operation of a reactor plant.

The present invention will become more apparent from the description of some preferred embodiments thereof taken in conjunction with the accompanying drawings.

BRIEF DESCRIPTION OF THE DRAWINGS

FIG. 3 is a longitudinal sectional view of a second embodiment of the present invention;

FIG. 4 is a view used for the explanation of an AC traveling wave magnetic field generating device used in the first and second embodiments shown in FIGS. 1 through 3;

DETAILED DESCRIPTION OF THE PREFERRED EMBODIMENTS

Figure 1:
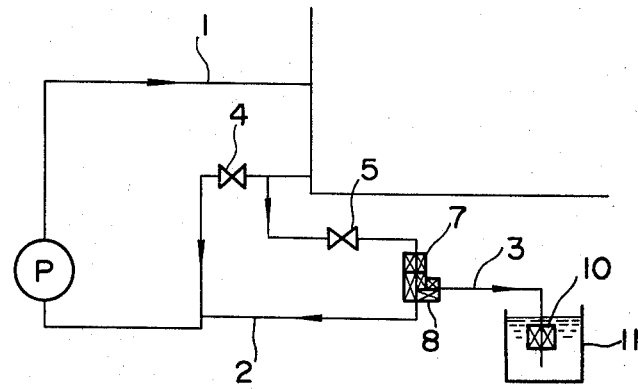
FIG. 1 is a flow diagram of a reactor cooling system in which is incorporated a first embodiment of the present invention.
Figure 2:
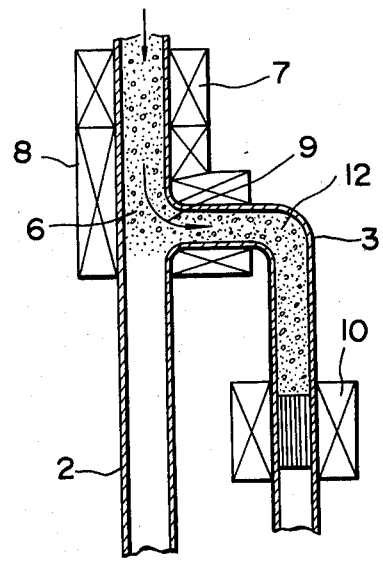
FIG. 2 is a longitudinal sectional view of the magnetic particle separating device shown in FIG. 1.

First Embodiment, FIGS. 1, 2 and 4

Referring to FIGS. 1 and 2, the main pipe 1 of a reactor cooling system is branched into a bypass or magnetic particle separation pipe 2. Valves 4 and 5 are inserted in the main and bypass pipes 1 and 2, respectively, downstream of the branched point.

An AC traveling wave magnetic field generating device 8 is disposed downstream of the valve 5 so as to surround the pipe 2. The traveling wave magnetic field generating device 8 is so constructed and connected electrically that it generates the AC magnetic fields moving downward in FIG. 2 concurrent with the flow in the pipe 2. Adjacent to the lower end of the traveling wave magnetic field generating device 8 mounted on the pipe 2, a magnetic or CRUD particle separation pipe 3 is branched at 6 and extended into a magnetic or CRUD particle collection container 11. Part of the traveling wave magnetic field generating device 8 also surrounds the separation pipe 3 as best shown in FIG. 2 so that magnetic particles 12 may be magnetically forced to flow into the separation pipe 3. A DC electromagnet or a permanent magnet 10 is mounted on the separation pipe 3 at the downstream of the traveling wave magnetic field generating device 8.

Next the mode of operation of the first embodiment with the above construction will be described. First, the valve 4 is closed while the valve 5 is opened so that the coolant with entrained magnetic particles 12 flows through the bypass pipe 2. Both the traveling wave magnetic field generating device 8 and the DC electromagnet 10 are energized so that the magnetic particles 12 are forced to flow concurrent with the traveling wave magnetic field 9 generated by the magnetic field generating device 8 and into the separation pipe 3. The terminal end of the separation pipe 3 being blocked by the collection container 11, coolant which is now free from the magnetic particles 12 flows through the bypass pipe 2 into the main pipe 1.

Separated CRUD particles 12 are settled by their own weights, are positively trapped by the DC electromagnet 10 and are accumulated in the container 11. The settling time of CRUD particles can be suitably controlled by adjusting the position of the DC electromagnet 10 along the separation pipe 3 so that the separated CRUD particles may be settled at an optimum efficiency.

Reference numeral 7 denotes a DC electromagnet or a permanent magnet which is mounted on the pipe 2 upstream at the traveling wave magnetic field generating device 8. CRUD particles entrained in the coolant are magnetized by the DC electromagnet or the permanent magnet 7 before they experience the traveling wave magnetic field so that the separation of CRUD particles may be much facilitated.

Second Embodiment, FIGS. 3 and 4

In FIG. 3 is shown a second embodiment of the present invention which is substantially similar in construction to the first embodiment described above with reference FIGS. 1 and 2 except that the separation pipe 3 is rectilinearly extended from the pipe 2. Alternatively, instead of using the bypass pipe 2, the separation pipe 3 may be directly connected to the main pipe 1. In such a case, the DC electromagnets or the permanent magnets 7 and 10 and the traveling wave magnetic field generating device 8 are mounted on the separation pipe 3.

In FIG. 4 is shown in detail the traveling wave magnetic field generating device 8 which may be used in the first and second embodiments. It carries around U-shape cores 14 full-pitch-winding and double-layer coil groups 15 connected to terminals $11u$, $11v$ and $11w$ in such a way that the magnetic fields may move downward as indicated by the arrow 13.

Third Embodiment FIGS. 5 through 10

In a third embodiment shown in FIGS. 5 through 10, instead of the traveling wave magnetic field generating device 8 which is annular in cross section, a pair of flat moving magnetic field generating devices 26 are used. The third embodiment has a flattened CRUD particle separation shell 24 with an inlet 21 and an outlet 22 for connection with the bypass pipe 2 (See FIG. 1) and a CRUD particle discharge pipe 23 with a Grey lock 38 and a discharge port 39.

The traveling wave magnetic field generating devices 26 are mounted on both the major surfaces of the flattened shell 24. As will be described below, they are so constructed and electrically connected that the traveling wave magnetic field may be produced in such a way that CRUD particles entrained in the coolant may be forced to flow downward to the right in FIG. 5 toward the inlet of the discharge pipe 23 as indicated by the arrows in the flattened shell 24.

Figure 8:
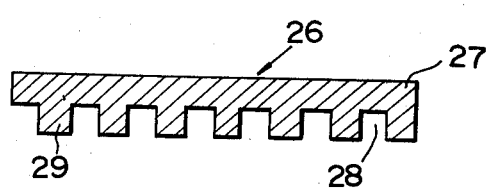
FIG. 8 is a sectional view taken along the line I—I of FIG. 7.
Figure 9:
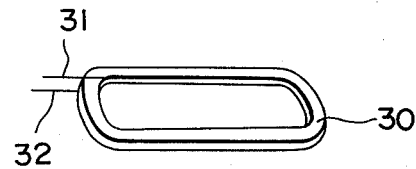
FIG. 9 is a perspective view of a coil of the traveling wave magnetic field generating device.
Figure 10:
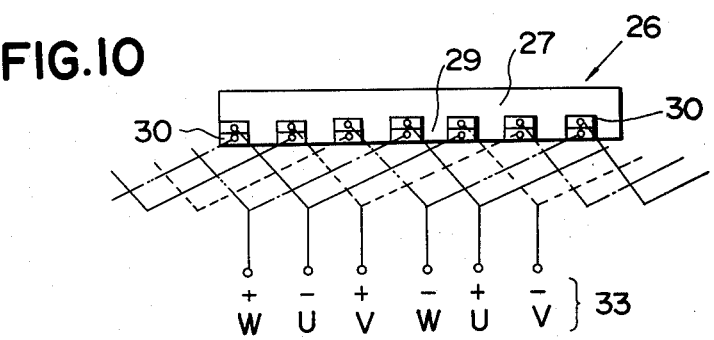
FIG. 10 is a view used for the explanation of the connection of the coils of the traveling wave magnetic field generating device with a three-phase power source.

Next referring particularly to FIGS. 7 through 10, the construction of the flat traveling wave magnetic field generating device 26 will be described. It has a flat magnetic plate 27 formed with a plurality of slanting slots 28 and magnetic poles 29 in one major surface thereof as best shown in FIG. 8. The coils 30 with terminals 31 and 32 as shown in FIG. 9 are placed in the slots 28 in double layer as best shown in FIG. 10 and connected to the terminals $33u$, $33v$ and $33w$ of a three-phase power source.

Figure 5:
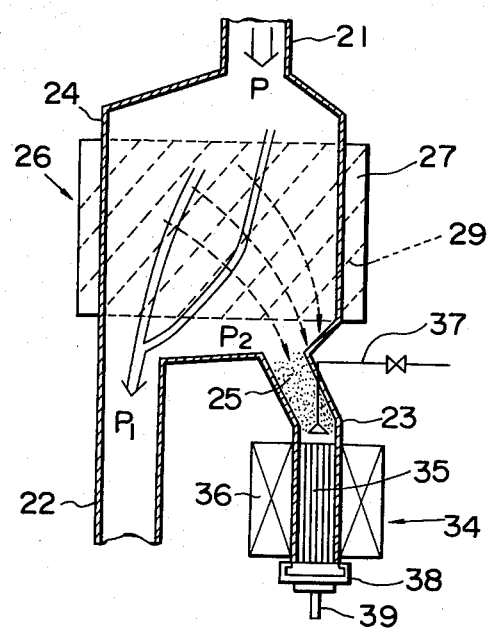
FIG. 5 is a longitudinal sectional view of a third embodiment of the present invention.

The traveling wave magnetic field generating devices 26 are mounted on the flattened shell 24 in symmetrical relationship with each other so that the magnetic fields produced by them move in the same direction (that is, slantingly downwardly as shown in FIG. 5). Therefore the magnetic or CRUD particles entrained in the coolant are separated and forced to flow toward the inlet of the discharge pipe 23.

Referring back to FIG. 5, magnetic particle trapping device generally indicated by the reference numeral 34 is attached to the discharge pipe 23. The trapping device 34 comprises a plurality of magnetic elements 35 made of, for instance, an amorphous metal and a DC electromagnet 36 mounted on the discharge pipe 23 so as to surround the same. The elements 35 are so disposed in the discharge pipe 23 that when the DC electromagnet 26 is energized, the elements 35 may establish the magnetic field with a steep gradient.

Furthermore, a washing or cleaning device 37 is provided so that magnetic or CRUD particles separated from the cooling water and trapped by the elements 35 may be washed. Alternatively, there may be provided a magnetic cleaning device which produces the traveling wave magnetic field, thereby magnetically "washing" the trapped particles.

Figure 6:
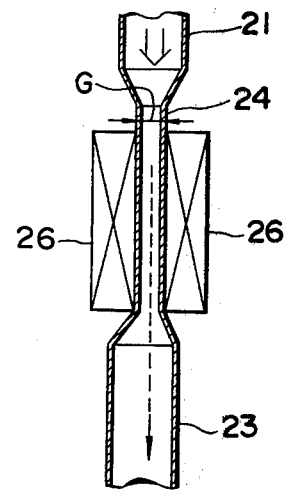
FIG. 6 is a longitudinal sectional view taken along a plane perpendicular to FIG. 5.
Figure 7:
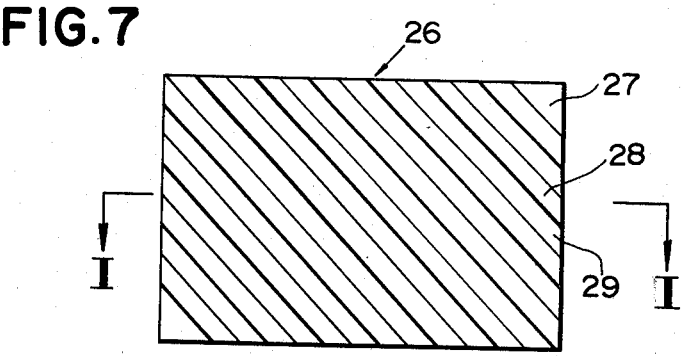
FIG. 7 is a front view of a magnetic flat plate of an AC traveling wave magnetic field generating device used in the third embodiment.

Referring still to FIGS. 5 and 6, when the cooling water P with entrained magnetic or CRUD particles flows into the flattened shell 24 through the inlet 21, its velocity is suddenly reduced. Furthermore, as compared with the cooling water flowing through the pipe sections 2 and 21, the area of the surface of the cooling water in contact with the inside walls of the flattened shell 24 is considerably increased. Since the AC electromagnets 26 produce the magnetic fields moving downward and to the right in FIG. 5 as described previously, the magnetic or CRUD particles $P_2$ are separated from the cooling water $P_1$ and forced to flow into the discharge pipe 23. The separation shell 24 is flat so that as indicated by G in FIG. 6, the air gap between the poles of the AC electromagnets 26 is small. As a result, with H=only 2 to 5 KG, the moving electric fields with a high intensity may be produced. Moreover, the poles 29 are slanted so that the separation of magnetic or CRUD particles may be separated from the cooling water without encountering strong resistances from the flow of coolant in the shell 24.

In the case of separation, strong magnetic particles such as magnetitic and maghemitic particles follow the traveling wave magnetic field while weak magnetic particles such hematitic particles are concentrated under the effect of the eddy current and attracted toward the inlet of the discharge pipe 23.

Some cooling water also flows into the discharge pipe 23 together with the separated magnetic or CRUD particles. In order to separate the magnetic particles from the cooling water in the discharge pipe 23, the DC electromagnet 36 is energized so that the elements 35 are also energized to attract the separated magnetic or CRUD particles. Thus trapped magnetic or CRUD particles can be washed away by discharging the water jets from the washing device 37. Alternatively, the magnetic washing device or AC electromagnet is energized to force the trapped magnetic or CRUD particles toward the bottom of the discharge pipe 23. The accumulated magnetic or CRUD particles can be discharged through the discharge port 39.

Figure 11:
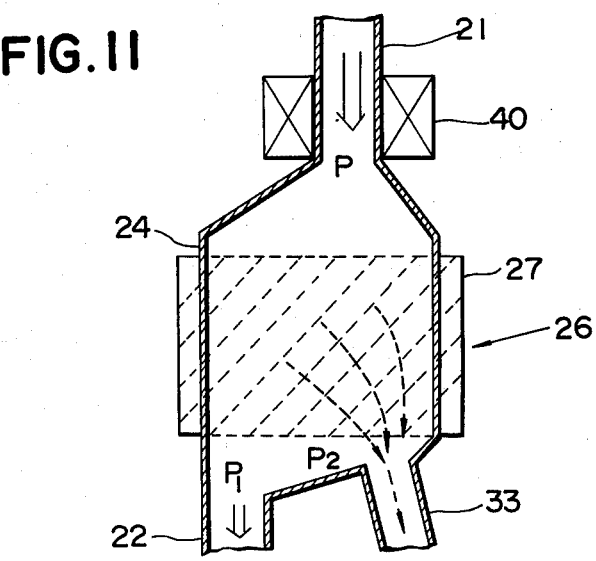
FIG. 11 is a longitudinal sectional view of a fourth embodiment of the present invention.

Fourth Embodiment, FIG. 11

In FIG. 11 is shown a fourth embodiment of the present invention which is substantially similar to the third embodiment described above with reference to FIGS. 5 through 10 except that a DC electromagnet 40 is mounted on the inlet 26 so that the magnetic or CRUD particles are magnetized before entering the flattened shell 24 and consequently the separation efficiency may be improved.

So far the preferred embodiment of the present invention have been described in conjunction with the reactor cooling system, but it is to be understood that the present invention is not limited to them and that various modifications may be effected without leaving the true spirit of the present invention. For instance, the magnetic particle separating device of the present invention may be equally applied to separate and remove from the working oil or lubricant relatively large magnetic particles which will inevitably cause serious damages to system components if not separated. In addition, instead of mounting the AC electromagnets 26 flat on the flattened shell 24, they may be wound around it.

The effects, features and advantages of the magnetic particle separating device of the present invention may be summarized as follows:

(i) In striking contrast with the mechanical separators such as filters, the magnetic particles can be automatically separated and removed continuously without increasing resistance to the flow of coolant or the like.

(ii) The magnetic particle separating device is completely free from clogging. As a result, cost in operating and maintaining the device can be considerably reduced as compared with the separators with filters.

(iii) The device can separate and remove magnetic particles which are extremely fine in size.

(iv) Magnetic particles can be completely separated and removed from the liquid bearing them so that the separated magnetic particles can be removed or discharged from the device without stopping its operation.

(v) When the magnetic particle separating device of the present invention is applied to separate magnetic particles from a coolant as described above, the coolant free from the magnetic particles may be recirculated.

When the magnetic particle separating device of the present invention is applied to a reactor cooling system as described previously, (vi) the radioactive contaminants can be separated and removed so that the safeguarded operation may be ensured; and (vii) the separated radioactive contaminants can be collected in a separate container so that the after-processing can be much facilitated.

What is claimed is:

1. A magnetic particle separating device for use in association with a hydraulic pipe through which flows a liquid with entrained magnetic particles, said separating device comprising:

branch means associated with the hydraulic pipe for dividing the flow in the hydraulic pipe between a first branch and a second branch defining a magnetic particle separation pipe which receives magnetic particles separated from the liquid, said branch means comprising a flattened shell defining a flow passage having a considerably increased cross sectional area over that of the hydraulic pipe;

traveling wave magnetic field generating means for generating a traveling wave magnetic field that directs the entrained magnetic particles to flow into said magnetic particle separation pipe, said generating means comprising a pair of flat members one of which is mounted on each of the major exterior walls of said flattened shell; and a first magnet mounted on said hydraulic pipe so that magnetic particles entrained in the liquid are magnetized before they reach the traveling wave magnetic field generating means.

2. A magnetic particle separating device as claimed in claim 1 further comprising high gradient magnetic separation elements disposed in the separation pipe downstream of said traveling wave magnetic field generating means, and means for exciting said elements provided at the outside of the separation pipe substantially at the position where said elements are disposed, said separation elements being adapted to trap the magnetic particles.

3. A magnetic particle separating device as claimed in claim 2 wherein said means for exciting is disposed for vertical movement.

4. A magnetic particle separating device as claimed in claim 2 wherein an AC traveling magnetic field is produced by said means for exciting, thereby magnetically washing the trapped particles.

5. A magnetic particle separating device for use in association with a hydraulic pipe through which flows a liquid with entrained magnetic particles, said separating device comprising:

branch means associated with the hydraulic pipe for dividing the flow in the hydraulic pipe between a first branch and a second branch defining a magnetic particle separation pipe which receives magnetic particles separated from the liquid, said branch means comprising a flattened shell which defines a flow passage having a considerably increased cross-sectional area over that of the hydraulic pipe and having an inlet and outlet for connection to the hydraulic pipe and a continuation thereof, respectively, and including a magnetic particle discharge port for connection to the magnetic particle separation pipe; and traveling wave magnetic field generating means for generating a traveling wave magnetic field that directs the entrained magnetic particles to flow into said magnetic particle separation pipe, said traveling wave magnetic field generating means comprising three phase AC electromagnetics mounted on said shell.

6. A magnetic particle separating device as claimed in claim 5 wherein said traveling wave magnetic field generating means is constructed flat and comprises opposed plates having aligned slots and poles directed toward said magnetic particle discharge port.

* * * * *

UNITED STATES PATENT AND TRADEMARK OFFICE
CERTIFICATE OF CORRECTION

PATENT NO. : 4,306,970
DATED : December 22, 1981
INVENTOR(S) : Hiroto Tanaka et al It is certified that error appears in the above—identified patent and that said Letters Patent is hereby corrected as shown below:

Col. 2, line 68, "at" should be --of--.

Col. 4, line 5, "cleaning" should be --cleansing--.

Col. 4, line 63, "embodiment" should be --embodiments--.

Signed and Sealed this

Eleventh Day of May 1982

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,306,970
DATED : December 22, 1981
INVENTOR(S) : Hiroto Tanaka et al It is certified that error appears in the above—identified patent and that said Letters Patent is hereby corrected as shown below:

In the Assignee section on the cover page of the patent after the word "Japan" please insert --and Tohoku Kinzoku Kogyo Kabushiki Kaisha, Japan--

Signed and Sealed this

Twenty-seventh Day of July 1982

[SEAL]

Attest:

Attesting Officer

GERALD J. MOSSINGHOFF

Commissioner of Patents and Trademarks